Patented Jan. 2, 1951

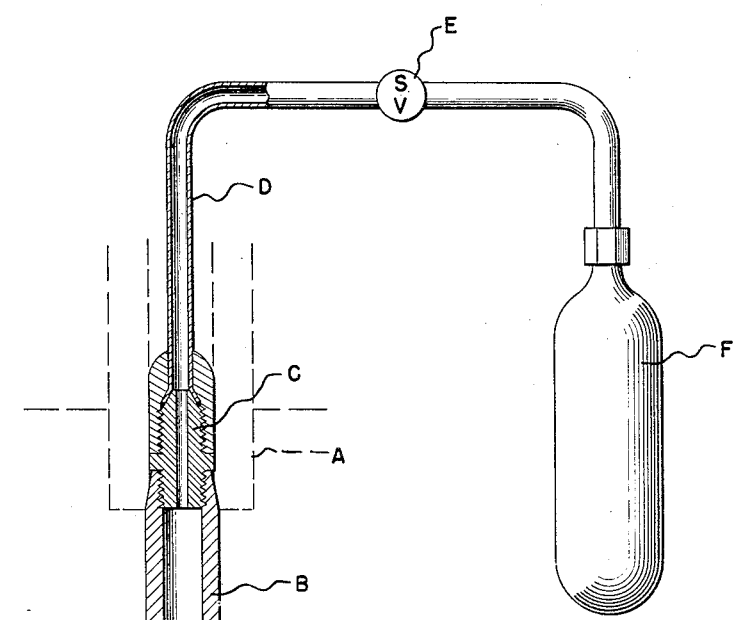
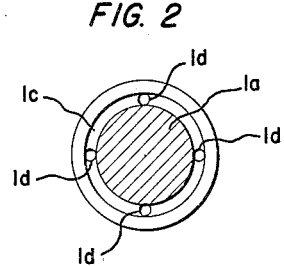

2,536,726

UNITED STATES PATENT OFFICE 2,536,726

GAS COOLED SPOT-WELD TIP

Leo W. Cornwall, San Diego, Calif.

Application August 16, 1949, Serial No. 110,587

6 Claims. (Cl. 219—4)

My invention relates to a gas cooled spotweld tip, more particularly for use in conducting carbon dioxide gas or the like, for maintaining a relatively low temperature surrounding the fusion area within materials being spotwelded together, and the objects of my invention are:

First, to provide a spotweld tip of this class having novel gas conducting recess means, which evenly distributes cooling gas in an annular pattern surrounding the welding area of the tip, whereby spotwelding discoloration of materials being welded together is effectively reduced;

Second, to provide a gas cooled spotweld tip of this class having an annular groove surrounding the welding surface of the tip, and slightly spaced therefrom, which evenly distributes an annular pattern of the gas around the tip axially thereof, for effectively cooling the same;

Third, to provide a gas cooled spotweld tip of this class which is very durable, due to the particular annular gas distributing recess therein, which maintains operation of the tip at a relatively low temperature;

Fourth, to provide a gas cooled spotweld tip of this class which is very compact and readily replaceable;

Fifth, to provide a gas cooled spotweld tip of this class which may be operated with considerable economy in the use of carbon dioxide gas for cooling the same, and the work being welded; and Sixth, to provide a gas cooled spotweld tip of this class which is very simple and economical of construction, efficient in operation, and which will not readily deteriorate or get out of order.

With these and other objects in view, as will appear hereinafter, my invention consists of certain novel features of combination, construction and arrangement of parts and portions, as will be hereinafter described in detail and particularly set forth in the appended claims, reference being had to the accompanying drawings and to the characters of reference thereon, forming a part of this application, in which:

Fig. 1 is a longitudinal sectional view of my gas cooled spotweld tip, shown in connection with a conventional holder, and communicating with a carbon dioxide gas supply, operated in connection with a conventional spotwelding machine, and illustrating by dash lines the work being welded adjacent said gas cooled spotweld tip and its opposing counterpart; and Fig. 2 is an enlarged sectional view, taken from the line 2—2 of Fig. 1.

Similar characters of reference refer to similar parts and portions throughout the several views of the drawings.

The conventional welding machine tip holder, as illustrated by dash lines A, supports the spotweld tip B, illustrated in my former Patent No. 2,440,463, which has now acquired the status of a conventional spotweld tip. Secured to the upper end of the tip B is a fitting C, to which the tube D is connected. This tube D communicated with a solenoid valve E, connected to the carbon dioxide supply F.

My gas cooled spotweld tip 1 is secured to the tip B in the conventional manner, and is provided with a straight circular in cross-section welding nib $1a$, integral with an enlarged diameter portion $1b$ at the transition of which an annular recess $1c$ is provided, which surrounds the circular in cross-section welding nib $1a$. Communicating with this recess $1c$ are passages $1d$, which extend into the hollow bore of the conventional tip B, communicating with the solenoid valve E, which dispenses a certain amount of carbon dioxide gas with each welding operation. It will be noted that the operation of the solenoid valve and the carbon dioxide supply equipment is no part of my present invention.

It will be noted that the connecting skirt $1e$ of the tip 1 and its connected relationship with the tip B is substantially the same structure as disclosed in my former patent, hereinbefore referred to.

The operation of my gas cooled spotweld tip is substantially as follows:

Each time current is supplied by the conventional spotwelding machine tip holder A to the tip 1 and its counterpart H, the resistance of the current afforded by the work G causes considerable heat and fusion of the work G together. With each fusion impulse, carbon dioxide gas is emitted by the solenoid valve, which is conducted into the tip B and through the passages $1d$ to the annular groove $1c$ surrounding the circular in cross-section welding nib $1a$ of my gas cooled spotweld tip. The annular groove $1c$ causes the annular distribution pattern of carbon dioxide gas to pass circumferentially and longitudinally of the welding nib $1a$ of the tip 1, which effectively lowers the temperature of the spotweld tip 1 with each operation, and tends to cool the work G surrounding the tip 1, preventing discoloration of the spots at which fusion occurs within the work. It will be noted that the passages $1d$ delivering gas to the annular groove $1c$ provide a supply of gas which readily surrounds the nib 1a, due to the intercommunicative relationship of the annular groove 1c with all of the passages 1d during issuance of the gas therethrough.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a gas cooled spotweld tip, a one piece tip member having a hollow portion at its inner end, adapted to receive gas, a circular in cross-section welding nib of solid construction at the opposite end of said tip, a plurality of passages from said hollow portion adjacent to the outer peripheral side of said welding nib, said tip provided with an annular groove communicating with said passages and surrounding said welding nib.

2. In a gas cooled spotweld tip, a one piece tip member having a hollow portion at its inner end, adapted to receive gas, a circular in cross-section welding nib of solid construction at the opposite end of said tip, a plurality of passages from said hollow portion adjacent to the outer peripheral side of said welding nib, said tip provided with an annular groove communicating with said passages and surrounding said welding nib, said groove open axially of said tip.

3. In a gas cooled spotweld tip, a one piece tip member having a hollow portion at its inner end, adapted to receive gas, a circular in cross-section welding nib of solid construction at the opposite end of said tip, a plurality of passages from said hollow portion adjacent to the outer peripheral side of said welding nib, said tip provided with an annular groove communicating with said passages and surrounding said welding nib, said groove open axially of said tip, said tip provided with an enlarged diameter portion adjacent said welding nib, in which said annular groove is positioned.

4. In a gas cooled spotweld tip, a single piece tip portion comprising a welding nib portion, a hollow holder connection portion, gas ports extending from said hollow holder connection portion into close proximity to said welding nib, said tip provided with an annular groove therein communicating with the outer ends of said gas ports surrounding said welding nib.

5. In a gas cooled spotweld tip, a single piece tip portion comprising a welding nib portion, a hollow holder connection portion, gas ports extending from said hollow holder connection portion into close proximity to said welding nib, said tip provided with an annular groove therein communicating with the outer ends of said gas ports surrounding said welding nib, said tip provided with an enlarged portion adjacent said nib in which said annular groove is positioned.

6. In a gas cooled spotweld tip, a single piece tip portion comprising a welding nib portion, a hollow holder connection portion, gas ports extending from said hollow holder connection portin into close proximity to said welding nib, said tip provided with an annular groove therein communicating with the outer ends of said gas ports surrounding said welding nib, said tip provided with an enlarged portion adjacent said nib having said annular groove therein, said annular groove open toward the welding end of said welding nib.

LEO W. CORNWALL.

REFERENCES CITED

The following references are of record in the file of this patent:

UNITED STATES PATENTS

| Number | Name | Date |
|---|---|---|
| 1,281,454 | White | Oct. 15, 1918 |
| 2,416,374 | Brumberg | Feb. 25, 1947 |